(No Model.) 2 Sheets—Sheet 2.

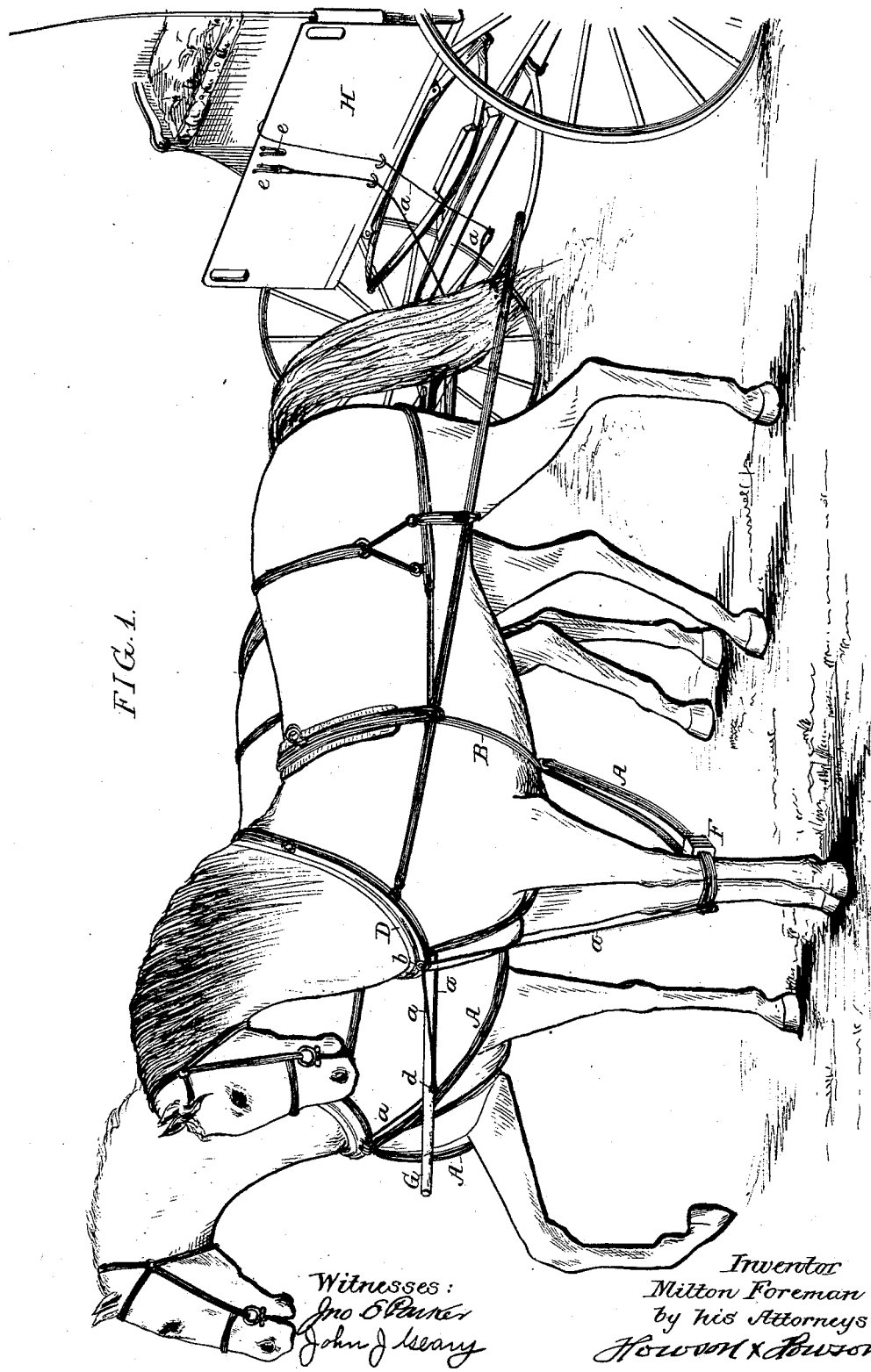

M. FOREMAN.
AUTOMATIC LASSO FOR HORSES.

No. 425,771. Patented Apr. 15, 1890.

Witnesses:
Jno. E. Parker.
John J. Geary

Inventor:
Milton Foreman
by his Attorneys
Howson & Howson

United States Patent Office.

MILTON FOREMAN, OF PHILADELPHIA, PENNSYLVANIA.

AUTOMATIC LASSO FOR HORSES.

SPECIFICATION forming part of Letters Patent No. 425,771, dated April 15, 1890.

Application filed May 16, 1889. Serial No. 311,078. (No model.)

*To all whom it may concern:*

Be it known that I, MILTON FOREMAN, a citizen of the United States, and a resident of Philadelphia, Pennsylvania, have invented an Automatic Lasso for Horses, of which the following is a specification.

The object of my invention is to provide simple and efficient means whereby the occupant of a vehicle may readily subdue a fractious or unmanageable horse or the horses of a team; and this object I attain by providing an attachment to the harness, consisting of an "automatic lasso," whereby the fore legs, or, if preferred, the hind legs, of the horse can be confined so as to bring the horse to a standstill.

Figure 2:
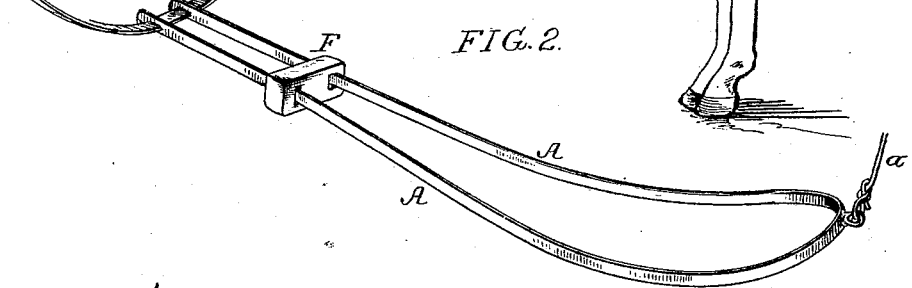
Figure 3:
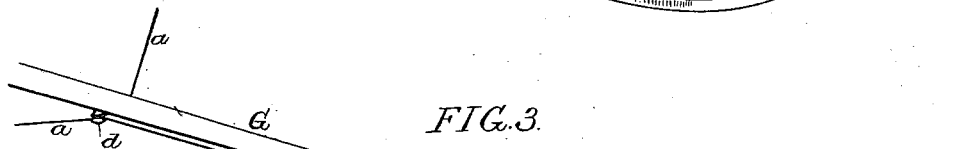
Figure 4:
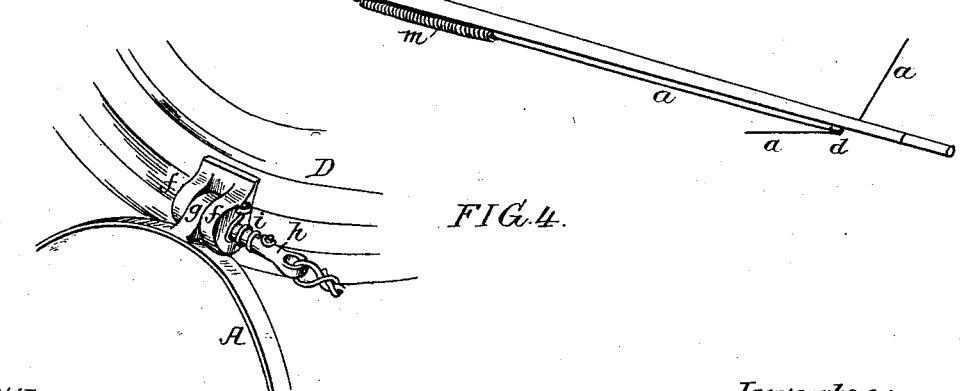

In the accompanying drawings, Figure 1 represents a double team, both horses of which are provided with automatic lassos in accordance with my invention, the releasing mechanism, however, being different in the two cases, and the lasso being shown as applied to the fore legs of one horse, but held in inoperative position upon the other horse. Fig. 2 is a perspective view of the device comprising the lasso. Fig. 3 is a perspective view of part of the pole of the vehicle and the operating-cords guided thereon. Fig. 4 is an enlarged view of a releasing device for the lasso, and Fig. 5 is a view showing the application of the lasso to the hind legs of a horse.

The lasso comprises, essentially, a looped strap, thong, cord, or equivalent device, preferably a strap A, hung to some convenient part of the harness of the horse, preferably to the belly-band B of the harness-saddle, the loop being of such length that when allowed to drop it will catch the fore legs of the horse below the knees. Under normal conditions the loop is held up over the breast of the horse by attachment to the collar D or some equivalent part of the harness, so that it is out of the way and does not interfere with the free action of the fore quarters of the horse. Before being attached to the belly-band the ends of the strap forming the loop are passed through an opening in a block F, preferably of metal, which block, when the loop is held up in its normal position, occupies a position close to the fixed end of the loop. When, however, the horse becomes fractious or unmanageable, the front end of the loop is released and permitted to fall down around the fore legs of the horse, and as it falls the weight sliding down on the strap of which the loop is composed will tighten said loop on the legs at a point below the knees, a proceeding which has the effect not only of bringing the horse to a standstill, but also of subduing him, so that he will not kick and injure the vehicle or the other horse, in case there is a team.

One of the simplest methods of supporting the loop in its elevated or inoperative position is to provide the same with an operating-cord $a$, passing through a pulley or ring $b$ on the collar or other supporting part of the harness; thence over a series of guide-pulleys $d$ on the pole or shaft G of the vehicle, to the dash-board H of the same, within convenient reach of the occupant of the vehicle, the end of the cord being so supported on the dash-board that it can be readily released therefrom when it is desired to permit the loop to fall and act as a lasso in the manner above described, hooks $e$ being shown in Fig. 1 as supports for the rear ends of the operating-cords. The friction of the operating-cord might, however, interfere with the quick drop of the loop, which is desirable; hence it may be preferable in some cases to provide on the collar or other supporting part of the harness a catch for engaging with and retaining the loop in the elevated position, this catch being tripped when it is desirable to permit the loop to fall. For this purpose the collar may have a pair of jaws $ff$, as shown in Fig. 4, these jaws receiving between them a suitable projection $g$ on the loop A, which is held in position by a bolt $h$, connected to the operating-cord $a$, the latter, as before, being led along the pole or shaft to the dash-board within convenient reach of the driver, so that a pull upon the cord will retract the retaining-bolt, release the loop and permit it to drop, a spring $i$ serving to prevent accidental withdrawal of the bolt.

Figure 5:
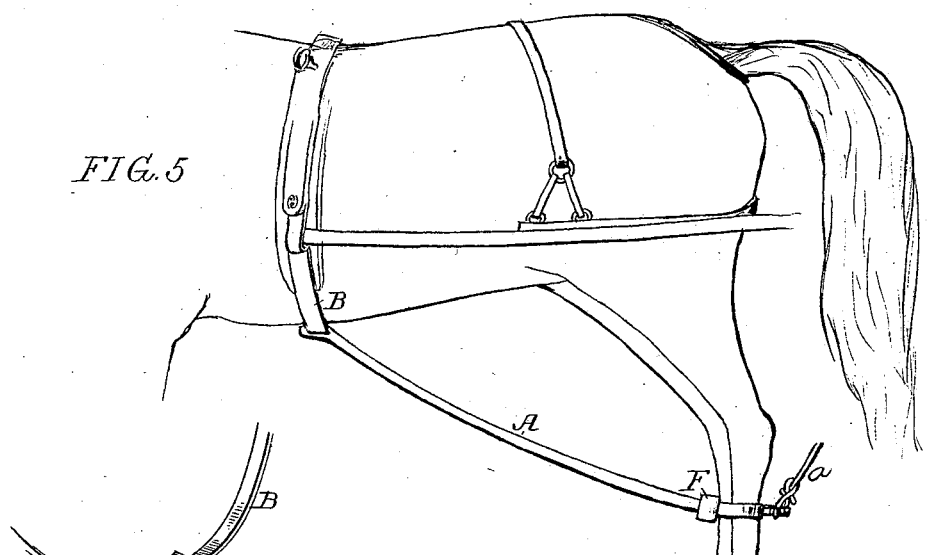

When it is desired to lasso the hind legs of the horse, as shown in Fig. 5, the loop A may be carried up outside the flanks of the horse and held in position by a catch on the crupper or crupper-strap, this catch being operated directly by the occupant of the vehicle, or being provided with a suitable operating-cord leading to within easy reach of the driver's seat.

The operating-cord is preferably provided with an elastic section $m$, Fig. 3, which will keep it taut under all the movements of the horse to prevent the loop from being lowered by the slackening of the cord or to prevent the withdrawal of the retaining-bolt from the catch.

Having thus described my invention, I claim and desire to secure by Letters Patent—

1. In a harness attachment, the within-described automatic lasso for horses, the same consisting of a loop adapted to be applied around the front or hind legs of the horse, a supporting device for said loop, and a sliding yoke or weight which, when the loop is released and permitted to fall, tightens the loop on the legs of the horse, substantially as specified.

2. In a harness attachment, the combination of the loop with its sliding weight or yoke, a support for the loop, and a tripping-cord leading to the vehicle, substantially as specified.

3. In a harness attachment, the combination of the loop and its sliding weight or yoke, a catch for supporting said loop, and a tripping-cord acting on said catch and extending to the vehicle, substantially as specified.

4. In a harness attachment, the combination of the loop, its sliding yoke or weight, a support for the loop, and an operating-cord therefor having an elastic section to permit the movement of the horse without lowering or releasing the loop, substantially as specified.

5. In a harness attachment, the combination of the loop, its sliding yoke or weight, a support for the loop, a pole or shaft having guides thereon, and an operating-cord for the loop led through the guides on the pole or shaft to the vehicle, substantially as specified.

In testimony whereof I have signed my name to this specification in the presence of two subscribing witnesses.

MILTON FOREMAN.

Witnesses:
WILLIAM D. CONNER,
HARRY SMITH.